United States Patent
Golemon et al.

[11] Patent Number: 6,018,643
[45] Date of Patent: Jan. 25, 2000

[54] APPARATUS AND METHOD FOR ADAPTIVELY FORMING AN ANTENNA BEAM PATTERN IN A WIRELESS COMMUNICATION SYSTEM

[75] Inventors: William P. Golemon; Henry S. Eilts, both of Plano, Tex.

[73] Assignee: Texas Instruments Incorporated, Dallas, Tex.

[21] Appl. No.: 08/867,751

[22] Filed: Jun. 3, 1997

[51] Int. Cl.[7] ................................ H04Q 7/20; H04Q 7/30
[52] U.S. Cl. ..................... 455/63; 455/562; 455/67.3; 455/65
[58] Field of Search .............................. 455/63, 65, 67.3, 455/562; 342/383, 368

[56] References Cited

U.S. PATENT DOCUMENTS

| | | | |
|---|---|---|---|
| 5,317,322 | 5/1994 | Grobert ................................... | 342/378 |
| 5,634,199 | 5/1997 | Gerlach et al. ........................... | 455/63 |
| 5,745,858 | 4/1998 | Sato et al. ................................ | 455/562 |
| 5,771,439 | 6/1998 | Kennedy, Jr. et al. .................... | 455/63 |
| 5,781,845 | 7/1998 | Dybdal et al. ............................. | 455/65 |

*Primary Examiner*—Dwayne D. Bost
*Assistant Examiner*—Alan T. Gantt
*Attorney, Agent, or Firm*—Ronald O. Neerings; Robby T. Holland; Wade J. Brady, III

[57] ABSTRACT

A system for wireless communication between a base station 30 and one or more remote stations 32 and 34 wherein the beam pattern of the receiving antenna 50–52 can be adaptively formed to track a desired signal. A series of weights is applied, one to each output of the elements of the receiving antenna and the weighted output summed to form the antenna output. The weights are adaptively modified so as to focus the beam in the direction of one of many signals which may be present in the data received by the antenna. A least-square-error process is used to identify if the signal beamed on is the desired signal. If such is not the case, the weights are modified to null out the earlier signal and to focus the pattern on another signal.

15 Claims, 4 Drawing Sheets

APPARATUS AND METHOD FOR ADAPTIVELY FORMING AN ANTENNA BEAM PATTERN IN A WIRELESS COMMUNICATION SYSTEM

BACKGROUND OF THE INVENTION

1. Field of the Invention

This invention relates to that disclosed and claimed in co-pending U.S. Patent Application, Attorney Docket TI-24746, filed on the same date as this application. This invention relates to the use of adaptive antennas in communications systems, and in the preferred embodiment, to the use of least squares estimation to control the adaptive antenna by determining the amplitude of supervisory tones in an AMPS system.

2. Background of the Invention

The Analog Mobile Phone System, or AMPS, is the standard cellular phone system in the United States. As cellular phone usage grows, other competing systems are becoming prevalent, but the AMPS system is forecast to be the principal US cellular network for the near future. While the invention has more general applications, the preferred embodiment will be disclosed in the context of the AMPS system.

In AMPS, each user is given two 30 kHz regions of the spectrum, one for transmitting to the base station (the uplink) and one for receiving from the base station (the downlink). Each 30 kHz spectrum carries one direction of the two way communication. The AMPS signal is a carrier signal, frequency modulated (FM) by the analog data to be communicated. Supervisory audio tones or SATs are also frequency modulated onto the carrier. The SATs are tones at 5,970, 6,000, or 6,030 Hz transmitted by the base station downlink (each base station uses one of the tones). The SATs or identifier components are used to aid in identification of the desired signal in a background of interfering signals which may be present in the received data. The mobile or remote station determines which tone is being used by the base station and regenerates that tone on the uplink. The presence or absence of the SAT is used in the call setup protocols for initialization of the communication and also in the handoff protocols when a mobile station travels from the region of one base station to another.

Figure 1:
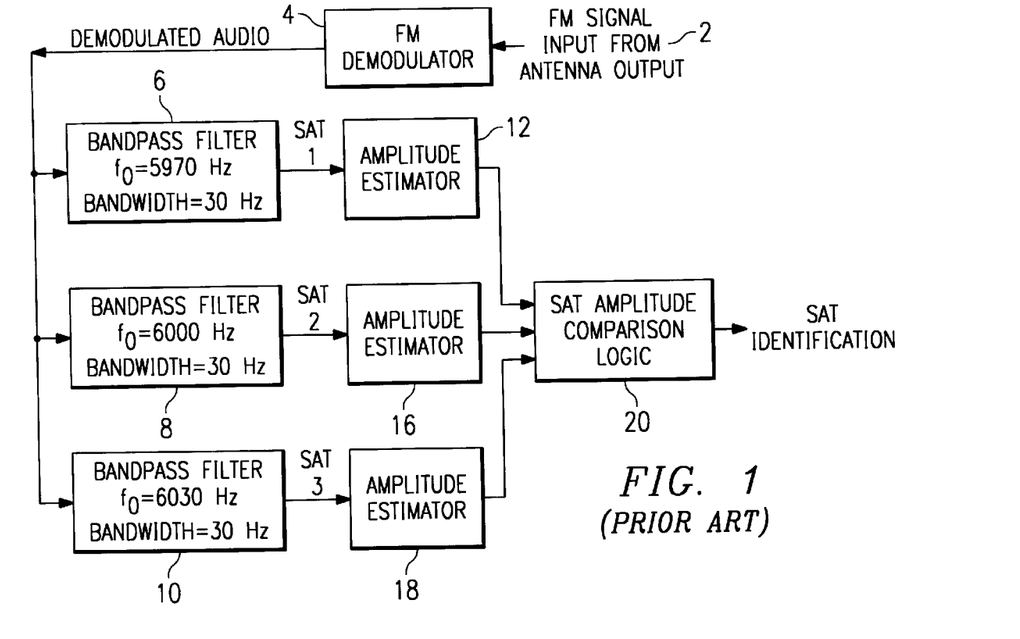
FIG. 1 is a block diagram of a prior art structure for determining the relative amplitudes of SATs which may be present in the received data.

FIG. 1 illustrates a prior art apparatus which can be used to determine which of the possible SAT tones has been received with a given FM signal. The FM input signal 2 is demodulated in demodulator 4 and is then coupled to the inputs of three parallel bandpass filters 6, 8, and 10, each centered at one of the SAT frequencies, and each having a bandwidth of 30 Hz. The propagation time of the signal through the filter is roughly the inverse of the bandwidth, that is about 33 msec in the present case. Because of the presence of surrounding cells, the received FM input signal may contain energy at any or all of the SAT frequencies. The filter outputs represent the amount of such energy at each of the three frequencies. The amplitudes of SAT signals at each of the SAT frequencies are then estimated by a short averaging process in amplitude estimators 12, 16, and 18. SAT amplitude comparison logic circuit 20 then determines whether or not the signal having the largest SAT signal is at the correct frequency. While the 33 msec filter delay time is acceptable in some applications, as will be more fully explained, that time is unacceptably long in others.

AMPS uses 832 30 kHz full-duplex channels. Each two-way communication channel is composed of two frequencies. The 832 frequencies allocated for the uplink are in the band from 824 to 849 mHz while the downlink frequencies are in the band from 869 to 894 mHz. To encourage competition, the FCC has mandated that there be the possibility of two major service providers in each metropolitan area. Thus, each service provider is given 416 of the 832 channels. Of these, 21 channels are used as control channels for controlling access and handoff, leaving 395 channels for phone calls.

The network is built on the concept of a cell, which is the region serviced by a base station. A metropolitan network is commonly composed of many tens of these cells. Each cell uses a subset of the available channels, typically about $\frac{1}{7}$ of the 416 available. Thus, the frequencies assigned to a given base station are reused at base stations elsewhere in the network. The base stations using the same frequency assignments must be separated by some distance in order to avoid interference caused by multiple users on the same frequencies. In other words, the current concept uses the signal attenuation associated with distance to control interference in the network.

As the use of such systems grows, many of the metropolitan cell sites operate at or near capacity. Because of the need for spatial attenuation between base stations using the same frequencies, it is difficult to add channels (frequencies) to the capacity limited base stations without causing unacceptable interference to other base stations.

SUMMARY OF THE INVENTION

In accordance with the principles of the invention, adaptive antennas can be used to add considerable capacity to a cellular network. An adaptive antenna can be designed to automatically point its antenna beam in the direction of the desired signal from a remote station and simultaneously cause nulls in the antenna beam pattern in the direction of interfering signals. The interference attenuation provided by an adaptive antenna can be substituted for the attenuation presently provided by distance in the cellular network. Thus, many more channels can be used without an increase in interference levels, thereby boosting network capacity.

An adaptive antenna is comprised of two or more individual antenna elements, each of which supplies an input RF signal to an associated receiver. The receiver is composed of amplifiers, mixers, filters, and other hardware necessary to downconvert the desired frequency channel to a frequency suitable for digitization. This signal can then be converted to quadrature signals, each of which is digitized in an analog to digital converter (A/D). Alternatively, the analog signal can be digitized prior to conversion to quadrature signals and the quadrature signals generated via digital processing at the receiver. The outputs of the receiver are the digital quadrature signals, commonly referred to as I (in phase) and Q (quadrature) signals. These signals are then coupled to a digital signal processor ("DSP") which performs the adaptive antenna processing and also, as will be further discussed below, employs a superresolution technique to generate an estimate of the amplitude(s) of each of the three SATs which may be present. As previously noted, the SAT amplitude estimates are used in the base station in the call setup protocols for initialization of the communication and also in the handoff protocols when a mobile station travels from the region of one base station to another. In accordance with the present invention, they are also used in the process of adapting the antenna to the signal involved in the communication.

Because of the close proximity of the cells in the cellular network, it sometimes happens that in the cell containing a given base station, the desired signal from a mobile station being served by the base station is corrupted by extraneous signals from nearby cells. To provide gain for the desired signal and attenuation of the interfering signals, the adaptive antenna circuits must be able to distinguish the desired signal from the interference. In AMPS, the underlying signaling format is FM, which does not provide a discriminant between desired and undesired signals. While the SATs can be used to identify the proper signal despite the presence of interfering signals, the SATs are unrecognizable in the RF or IF signals and can only be differentiated after the FM signal has been demodulated.

A constant modulus ("CM") process is used to control the adaptive antenna. Frequency modulated carriers are of constant amplitude (modulus) making the CM process appropriate. The CM process has two characteristics that must be accommodated in order for it to be useful:

1. The CM process will form a beam on the largest CM signal present, nulling every other signal.
2. Having previously formed a beam on a signal, the CM process will not form a beam on another signal until the first signal's power falls near or below the noise power of the system.

These characteristics must be evaluated with respect to the AMPS signal environment. The cellular signals are constantly changing in amplitude and phase at rates determined by the velocity of the mobile phones. At any given time, the desired signal may or may not be the strongest signal present at the base station. On the average, the desired signal is the strongest, but this may not be true on an instantaneous basis. The CM process points the antenna beam at the strongest signal, which is the desired signal most of the time. At some point, however, the desired signal may temporarily fade to the noise level of the system, at which time the CM process will point the beam at an interference signal and begin nulling of the desired signal. If undisturbed, the beam will remain pointed at the interference and the desired signal will be nulled until the interference fades to the noise level, at which time the process will adapt to the strongest signal present at that time.

This behavior is not compatible with effective use of the current cellular system. If the antenna continues to null the desired signal for any significant length of time, the base station will drop the phone call. An approach to preventing this is to examine the signal at the output of the adaptive processor for an improper SAT. If the wrong SAT is detected, then the adaptive processor has formed a beam on the wrong signal and nulled the desired signal. The adaptive antenna is then reinitialized and forced to readapt to the current signal scenario. This process is repeated until the proper SAT is detected in the output. To prevent the base station from dropping the call, it is essential that this process be performed as quickly as possible.

The timing of this process is critical. The adaptive time of the antenna ranges between one and three msec. Since the SATs are separated in frequency by only 30 Hz, the filtering and identification of the individual SATs using conventional techniques typically takes something on the order of 33 msec. This is not compatible with the requirements of the adaptive antenna in the AMPS system.

In the preferred embodiment of the invention, a superresolution approach is used to accomplish the SAT determination. Superresolution is a term normally applied to antennas and denotes the resolving of signals in space closer than would normally be possible, given the size of the antenna. There are many techniques available to do this. One such technique, used in the present embodiment, is the Least Square Error ("LSE") estimation process. Others examples include Multiple Signal Identification and Classification (MUSIC), Estimation of Signal Properties by Rotational Invariance Techniques (ESPRIT), and Maximum Likelihood.

Mathematically, the filter problem of resolving frequencies closely spaced in frequency is analogous to the antenna problem of resolving signals closely spaced spatially. In the filter problem, the conventional limit is the length of the data sequence required to resolve the signals, given by the inverse bandwidth of the filters. In the antenna problem, the conventional limit is the length of the antenna (as measured in wavelengths) required to achieve a given angular resolution, given by the inverse of the beamwidth of the antenna.

The LSE process yields an estimate of the complex amplitudes (amplitude and phase) of the three received SATS. The output of the estimation process is a control signal which causes the adaptive antenna to readapt to its signal environment. Since the mean received power of the desired signal is stronger than the interference, this process eventually results in the antenna forming a beam on the desired signal.

DESCRIPTION OF THE PREFERRED EMBODIMENT

Figure 2:
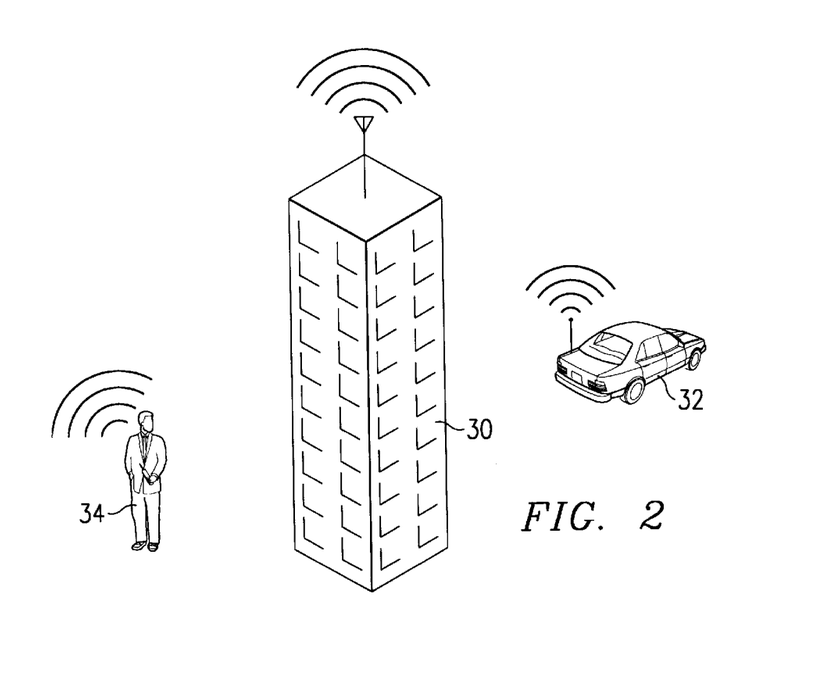
FIG. 2 is a graphical illustration of an AMPS system.

FIG. 2 is a graphic illustration of the components of a wireless communication system such as AMPS. A base station 30 serves as the focal point of the system. Users such as in an automobile 32 or on foot 34, seeking to communicate with each other, do so under the control of the base station 30. While the antenna pattern of the base station is shown as roughly omnidirectional, in accordance with the principles of this invention, the pattern can be caused to be highly directional.

Figure 3:
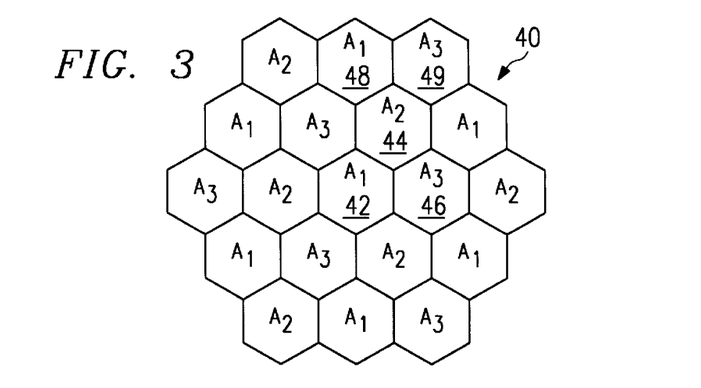
FIG. 3 is a surface spatial representation of an area 40 of the surface of the earth to be served by an AMPS system.

FIG. 3 is a surface spatial representation of an area 40 of the surface of the earth to be served by an AMPS system. The area is divided into a plurality of hexagonal shaped regions, each to be served by a single base station. One such region 42 is labelled $A_1$. Within such a region, the base station has available for its use about sixty frequency-pair channels, each frequency having a 30 kHz bandwidth. As previously noted, the base station uses a pair of frequencies in communicating with any particular user or mobile station, one frequency for the uplink and one for the downlink. The frequency-pair forms one two-way communications channel. Given the relatively large number of channels available to this base station, it is able to use different pairs of frequencies to communicate with each mobile station in its region and thereby avoid cross communication between mobile stations.

Audio information is transmitted by using the audio signal to frequency modulate the carrier frequency. Typically this audio information is band limited to about three kHz. In addition to carrying the audio information, the carrier frequency is further frequency modulated by one of the SAT signals which reside at or very near six kHz. In FIG. 3, the subscript 1 in the $A_1$ designator is used to indicate that the lowest of these three SAT frequencies, 5970 Hz will be used for all transmissions in region 42.

Surrounding and immediately adjacent to region 42 are six other regions such as regions 44 and 46. Each of these six regions will be assigned a complement of carrier frequencies different than those assigned to region 42. Further, the assignment of carrier frequencies is made in such a way as to ensure that no two adjacent regions will have the same complement. Regions 44 and 46 are labelled $A_2$ and $A_3$ to indicate that the SAT signals used to frequency modulate the carrier frequencies in these two regions will be at 6000 Hz and 6030 Hz respectively. These second two SAT signals are used in each of the other four regions surrounding region 42, and are used in such a way that no two adjacent regions will have the same SAT frequency.

Surrounding this first ring of regions is a second ring of regions such as region 48. Again, the sets of channel or carrier frequencies are assigned to these regions in such a way as to ensure that no two adjacent regions will have the same complement of carrier frequencies. This is true despite the fact that some of the complements of carrier frequencies used in region 42 or in the first ring of surrounding regions must be used again in the second ring.

Also in the second ring, the subscripts 1, 2 and 3 are used to denote which of the three SAT frequencies are used in the various regions of this ring. In region 48, for example, the lowest SAT frequency, 5970 Hz is used just as it is in region 42. Given the fact that only three SAT frequencies are available, it is inevitable that, while it can normally be provided that no two adjacent regions will use the same SAT frequency, such duplication must occur in relatively closely spaced regions such as regions 42 and 48. Where such duplication occurs, however, efforts are made to ensure that and two closely spaced regions which use the same SAT frequency will not also have the same complement of carrier frequencies.

Now, let it be assumed for purposes of illustration that the same complement of carrier frequencies is used in both regions 42 and 49. It may happen then that the base station of region 42 may receive a frequency modulated signal from a mobile station which is located outside its own region, such as in region 49. The base station in region 42 must be able to recognize this as an anomalous signal and not respond. To do so it must demodulate the frequency modulated signal and identify the frequency of the SAT signal associated therewith. In this case it will determine that the SAT frequency of the received signal is 6030 Hz rather than the 5970 Hz used in region 42. The base station in region 42 will, therefore, reject this as an anomalous signal.

Figure 4:
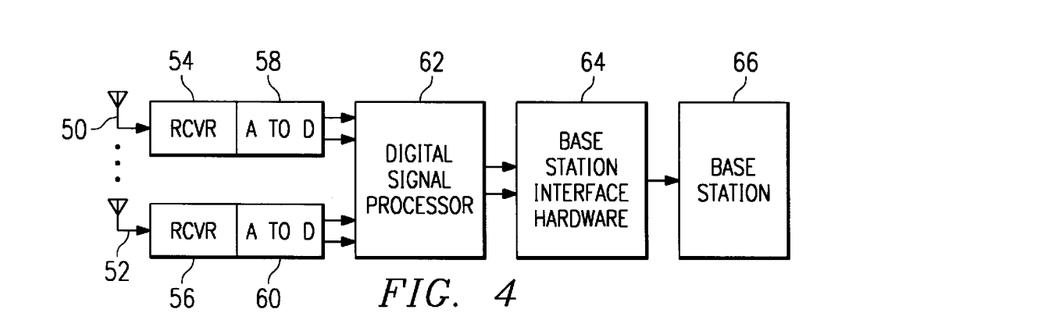
FIG. 4 is a block diagram showing the structural elements of the invention.

A block diagram of the system is shown in FIG. 4. The adaptive antenna is comprised of a series of antenna elements 50–52. In a typical application, these elements have identical individual beam patterns and range in number from two to eight, although other numbers of elements are possible. The outputs of these antenna elements are coupled respectively to a series of receivers 54–56. The receivers serve to downconvert the desired frequency spectrum to baseband (zero intermediate frequency) or some other low intermediate frequency. The downconverted signals are then converted to quadrature signals and coupled respectively to a series of A to D converters 58–60. The outputs of each of the A to D converters are digitized I (in phase) and Q (quadrature) signals. The digitized I and Q signals from each of the converters provide the inputs to the digital signal processor ("DSP") 62 which performs the adaptive antenna processing and also employs the LSE processing to generate an estimate of the amplitude of all of the three SATs which may be present. DSP 62 may be any of various models in the TMS320 series such as the model TMS320C52 available from Texas Instruments Incorporated of Dallas, Texas. It has been demonstrated that resolution times of approximately 0.005 seconds are achievable using the LSE process. While the adaptive antenna output signal is coupled through base station interface hardware 64 to base station 66 at all times, once the antenna has been adapted to focus the beam pattern on the correct incoming signal, this signal will be the primary component in the antenna output. In addition, the SAT identification information, which has been accomplished by DSP 62, can optionally be passed on to base station 66.

Figure 5:
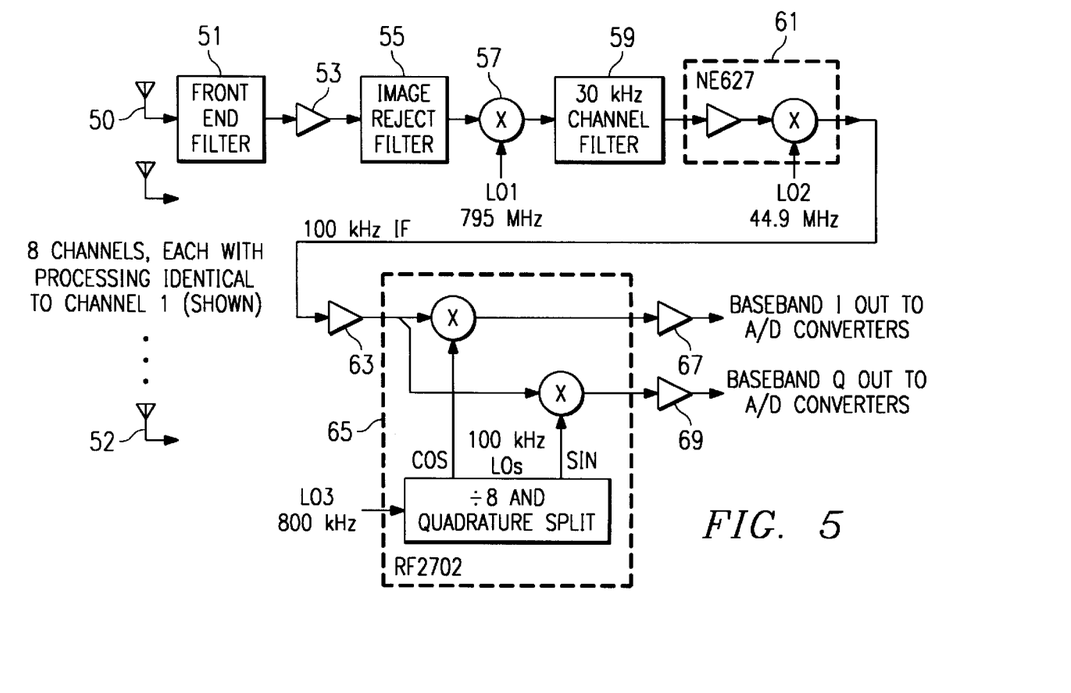
FIG. 5 is a detailed block diagram of the receiver portion of the adaptive antenna.

The structure of one of receivers 54–56 is shown in greater detail in FIG. 5, it being understood that each of the other eight receivers in this embodiment will have identical structures. The output of antenna 50 is coupled to a front end filter 51 which serves to limit the spectrum of the signal which is passed to low noise amplifier ("LNA") 53 and thereby prevent saturation of the LNA by spurious signals. The output of LNA 53 is coupled through image reject filter 55 to the input of mixer 57 which has a 795 mHz local oscillator input and serves to downconvert the 840 mHz signal to a 45 mHz intermediate frequency. The mixer would also mix a 750 mHz image to the same intermediate frequency, but this is prevented by the image rejection filter which removes the 750 mHz components from the input of mixer 57.

The output of this first mixer 57 feeds a 30 kHz bandpass filter 59 and a NE627 IF amplifier/downconverter 61 available from Philips Semiconductor located in Sunnyvale, California. Filter 59 is the final filter in the signal path and sets the A/D conversion bandwidth at the AMPS spectral bandwidth of 30 kHz. The NE627 provides IF amplification and, with a second local oscillator input of 44.9 mHz, mixes the signal down to the second IF of 100 kHz. The 100 kHz intermediate frequency is further amplified by amplifier 63 and then mixed to baseband by an RF2702 quadrature downconverter 65, available from RF Micro Devices, Inc. located in Greensboro, N.C. The RF2702 divides a third local oscillator signal at 800 kHz down to 100 kHz, and uses the divided down signal to mix the 100 kHz signal to inphase, I, and quadrature, Q, output baseband signals. These signals, after further amplification by amplifiers 67 and 69, provide the inputs to A to D converter 58 of FIG. 4.

Figure 6:
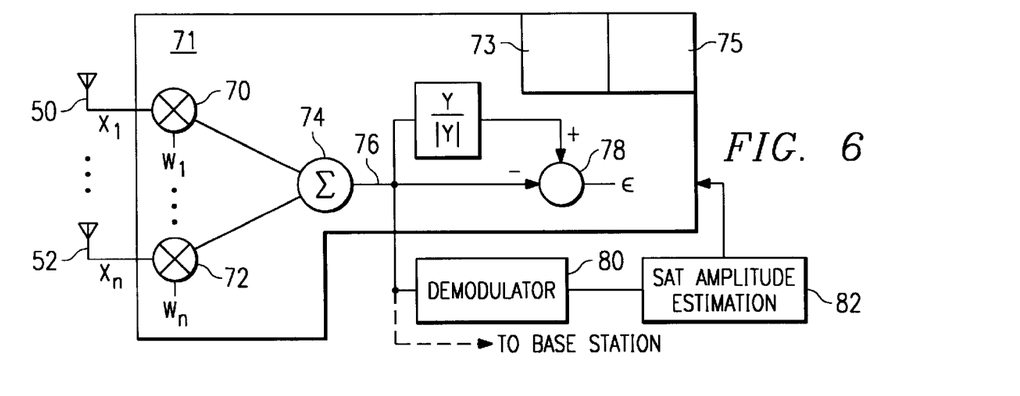
FIG. 6 is a symbolic representation of the adaptive antenna and LSE processing within the digital signal processor.

The adaptive antenna and LSE processing within DSP 62 are illustrated symbolically in FIG. 6. The signals from antenna elements 50–52 are first applied to complex weight multipliers 70–72. While, in the interest of clarity, the filtering and digitizing elements are not shown in FIG. 6, the actual inputs to the multipliers are the digitized I and Q signals. In FIG. 6, the N complex numbers comprising one sample in time from each of the elements are designated as the $x_i$. For any given sample time, j, these N complex numbers can be thought of as comprising a row vector, $x_j$, having the elements, $x_i$, i=1, 2, ..., N. In each multiplier, the complex input signal, $x_i$, is multiplied by a complex weighting factor, $w_i^*$. The N complex weights can also be thought of as comprising a column vector, $w^*$, having the elements, $w_i^*$, i=1, 2, ..., N. The computation of values for the $w_i$ and $w_i^*$ (where the asterisk (*) denotes the complex conjugate) will be discussed below. The weighted input signals are then summed as shown at summer 74 to form a digitized complex antenna output signal 76 which will hereinafter be generally designated as y. The variable y actually represents a time sequence of sampled values, $y_j$, j denoting the time of the sampled value in y. At any instant, j, the value of $y_j$ is the inner or scalar product of the vectors $x_j$ and $w^*$. Expressed in vector notation, this is:

$$y_j = x_j \cdot w^* \tag{1}$$

In Equation 1, the vector, $w^*$, is a vector in which each element is the complex conjugate of the corresponding element in the vector, w.

Each sample, $y_j$, is then used to generate the value of the sample itself, normalized to a constant modulus of one. This normalized version of $y_j$ will be designated as $d_j$ and is equal to the ratio, $Y_j/|y_j|$, where $|y_j|$ represents the absolute value of $y_j$. While the amplitude of y will, as the result of variables in the physics of electromagnetic wave propagation, vary from time to time, the normalized y will have a constant amplitude or constant modulus. The difference between $y_j$ and the normalized $Y_j$ is shown symbolically at 78 as an error signal $\epsilon_j$. While, in the preferred embodiment, the error signal, $\epsilon_j$, is not actually determined, its definition, as illustrated in FIG. 6, is necessary to an understanding of the following development. Each of the $y_j$, $d_j$ and $\epsilon_j$ where j=1, 2, ... can be used to form respective column vectors y, d and $\epsilon$.

The antenna output signal, y, is also demodulated at 80 and used as the input to the SAT amplitude estimation processor 82. The SAT identification provided by this processor is used in the adaptive antenna process as will hereinafter be described. In one embodiment of the invention, the adaptive antenna and SAT estimation processors will form integral parts of a base station. Alternatively, in this disclosed embodiment, where it is desired to add the adaptive antenna capability to an already existing base station, apparatus as described to this point can comprise a stand-alone beam forming system, the output of which is an input signal to the associated base station. In this case, the signal y, after appropriate formation of the desired antenna beam pattern, is reconverted up to the RF frequency signal which is expected by the base station hardware. This is shown diagrammatically in FIG. 6 where the signal y is also shown as an optional input to the base station and is accomplished by the base station interface hardware 64 of FIG. 4. Base station interface hardware 64 accomplishes the mirror image function of the apparatus illustrated in FIG. 5 and, as is well understood by those skilled in the art, can be accomplished with related hardware. In such an embodiment, the SAT identification process, which has already been performed once for purposes of adapting the antenna, may be repeated at the base station for the purpose of identifying the proper signal reception. Alternatively, the identity of the SAT, determined at block 82 of FIG. 6, can be transmitted to the base station for its use.

Still with reference to FIG. 6, the SAT identification provided by SAT extraction processor 82 provides an input to a beam forming or focusing subsystem 71. Focusing subsystem 71 includes most of the elements portrayed in FIG. 6 as well as apparatus to perform additional functions yet to be described. In addition to the SAT identification, the beam forming or focusing function utilizes the vector, d, that is the vector of samples $y_j$ each normalized to a constant modulus of one, as well as the current set of weights, $w_1$–$w_n$, and a series of the data samples, $x_1$–$x_n$. As hereinafter described in greater detail, in the event that the SAT identification provided by SAT extraction processor 82 indicates that the signal on which the beam is currently focused does not contain the desired SAT, a nulling subsystem 73, which is part of focusing subsystem 71, functions to re-initialize the set of weights, $w_i$–$w_n$, and to adapt these weights so as to create a beam pattern which is focused on the next largest signal present while having a null in the direction of the previously largest received signal. In the event that the SAT identification indicates that the signal on which the beam is currently focused does contain the desired SAT, a tracking subsystem 75, also a part of focusing subsystem 71, functions without re-initialization of the weights to continuously adapt the weights in such a way as to keep the beam focused on the signal having the desired SAT irrespective of the fact that the source of this signal may be in a state of motion.

The adaptive beamforming process proceeds as follows. The adaptation process constitutes the search for the correct series of complex weights, $w_1$, which results in an antenna beam pattern focused in the direction of the strongest RF signal present in the received data. Ideally, the strongest signal will be the signal the antenna is seeking to detect, that is the one having the expected SAT or identifier tone. In some cases, however, the strongest signal in a cell may be extraneous, that is one originating outside the cell. In such case, the adaptive process will focus the beam pattern in the direction of this extraneous signal.

The adaptation process begins by collecting a sequence of vector samples, $x_j$, and using these vector samples along with an initial weight vector, $w_o$, to compute corresponding sequences of the output, $y_j$, and the reference signal, $d_j$. The data from the vector samples, $x_j$, and the corresponding reference signal values, $d_j$, are then used in a least-squares computation, as hereinafter described, to generate a new weight vector, $W_{new}$. The new weight vector results in an antenna beam pattern focused in the direction of the strongest RF signal present in the received data. While the error, $\epsilon_j$, is not normally computed, it is known from theory that this least-squares computation results in a new weight vector that minimizes the sum of the squared error, S, which is defined as follows:

$$S = \sum_j \epsilon_j \epsilon_j^* = \sum_j |\epsilon_j|^2 = \sum_j \text{Real}^2(x_j) + \text{Imag}^2(x_j) \tag{2}$$

At the beginning of the adaptation process, the individual weights of the initial weight vector, $w_o$, have the following values: $w_i=1$ and all the other $w_i$ are equal to zero. This results in a very broad initial beam pattern which may admit a number of signals which can be present within the pattern.

After the least squares computation leading to new weight vector, $W_{new}$, the beam pattern will have been focused on the largest signal present in the received data. A series of data samples is processed with this new weight vector and the resulting signal processed as hereinafter described to determine which identifier tone is present in the signal on which the beam is focused. In the event that this identifier tone is not the expected tone, it is known that this largest signal is not the desired signal and the adaptation process is repeated, this time beginning with the following different initial weight vector.

$w_o = w_i$ where $w_i$ is a weight vector orthogonal to the adapted vector which focused the beam on the signal having an incorrect identifier tone.

The orthogonal weight vector is derived by forming the matrix, P. as follows:

$$P = I - w_{now} \cdot W_{new}^H \quad (3)$$

where I is the identity matrix. When so formed, every column of P is a vector which is orthogonal to the old weight vector, $w_{now}$, and can be used as new initial weight vector, $w_i$, for the next adaptation. We have found, however, that some of these vectors in P may lead to a null in the direction of the desired signal as well as to a null in the direction of the largest interfering signal. It has proven more efficacious to sum the set of column vectors of the matrix, P, and use this sum as the initial weight vector for the next iteration. This set of weights results in a more omnidirectional beam pattern, the main departure being the presence of a null in the direction of the largest interfering signal.

This differing initial weight vector, after another cycle of adaptation, in addition to having a null in the direction of the largest signal present, is focused on the next largest signal present in the received data. Additional data is processed with the new weight vector to determine which identifier tone is present in this next largest signal. If it too is not the expected identifier tone, the process is repeated iteratively, each iteration resulting in a beam pattern with nulls in the directions of all signals which have been determined to have incorrect identifier tones and focused on the next largest remaining signal present in the received data.

Ultimately this process results in a beam pattern focused in the direction of the desired signal, that is the signal having the correct identifier tone. The adaptation process continues at this point, but on each iteration thereafter, the initial weight vector is the weight vector which resulted from the previous iteration, that is:

$w_o = w_{previous}$ where $w_{previous}$ is the weight vector resulting from the immediately preceding iteration.

As a result, the process continues to focus the beam on the desired signal and track any movement of the source of the desired signal should that source be mobile.

The concept of orthogonality may be visualized by focusing on a relatively simple situation. The set of weights, $w_i$, can be thought of as constituting a vector in multi-dimensional space, the number of dimensions in the space being equal to the number of antenna elements or corresponding weights, $w_i$. In the event that the number of elements or weights is three, the multi-dimensional space can be readily visualized, and has three axes, x, y and z, separated from each other by ninety degrees. Let it be assumed that the set of weights which focused the beam on the largest interfering signal comprise a vector which lies along the z axis. Then as the process searches for a new set of weights, $w_i$, and a corresponding vector, that vector will be orthogonal to the original vector if it is constrained to lie in the plane defined by the x and y axes.

Following is the process by which the adaptive antenna proceeds from a starting set of weights to a set of weights that focuses the beam on the largest signal present (other than the signal(s) which has been nulled out). Recall that the digitized signal samples from the individual antenna elements at time j constitute a row vector, $x_j$. After collection of a series of sets of such samples, the corresponding row vectors, $x_j$, j=1, 2, ..., M can be used as the rows of an N×M matrix, A. We have observed successful operation of the system where M, the number of such sets, falls in the range eight to 128, but do not believe the invention to be so constrained.

If the individual $y_j$ are used as the elements of an M-dimensional column vector, y, this vector is given by the following relationship.

$$y = Aw^* \quad (4)$$

Here A is the matrix formed of the input data sample vectors, each corresponding to one of the sets of collected data. The elements of the vector, y, are each a sample of the summation of the observed data after weighting with the set of weights in use as the data is collected. The vector, w, represents the new set of weights which is to be determined.

The relationship between the vectors $\epsilon$, y and d is given by:

$$\epsilon = y - d \quad (5)$$

Substituting (4) in (5) yields:

$$\epsilon = Aw^* - d \quad (6)$$

The squared length of this error vector, $\epsilon$, is minimized when the error vector is orthogonal to the column space of the matrix A. This condition is expressed as:

$$A^H \epsilon = 0 \quad (7)$$

Here the matrix, $A^H$, (A Hermitian) is a matrix containing elements, each of which is the complex conjugate of the corresponding element of the matrix, A, and is further the transpose of the matrix, A, with the conjugated elements. Combining (6) and (7) and solving for $w^*$ yields:

$$w^* = (A^H A)^{-1} A^H d \quad (8)$$

Here, $w^*$ is the optimal least square error weight vector. This weight vector results in the best match of the output vector, y, to the vector, d, in the sense that it minimizes the sum of square errors of Equation (2). From Equation (8), it is seen that $w^*$ is a function of the data matrix, A, and the vector, d. The vector, d, however has been computed based upon the previous or initial weight vector, $w_o$. This process could be iterated. That is, starting with an initial weight vector, $w_o$, one could take a data set, form A and d, and compute a new weight vector, $w_1^*$ by application of Equation (8). Then, using $w_i^*$ and the original data set (the same A) compute an improved d, and apply Equation (8) again to compute another new weight vector, $w_2^*$. This process can be continued until the weight vector does not change substantially after each iteration. This has been explored and the convergence of the process to a stable weight value is quite rapid, In fact, convergence is virtually complete after the first iteration, so repeated iterations of Equation (8) are not needed or used. The resulting vector from a single iteration of Equation (8), $w^*$, is comprised of the set of weights, $w_i$ which will focus the beam on the largest signal present (other than signals which have been nulled out of the beam pattern by virtue of previous iterations through the adaptive process).

Figure 7:
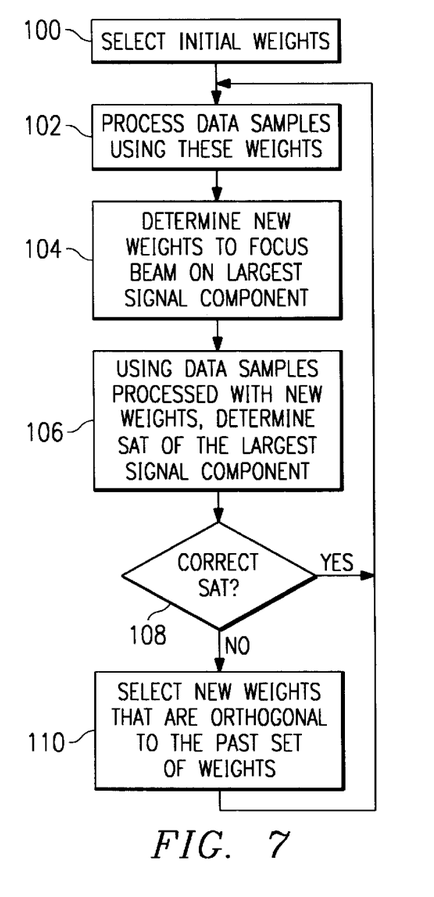
FIG. 7 is a flow chart summarizing the operation of the adaptive beam forming process performed in the digital signal processor.

FIG. 7 is a flow chart summarizing the operation of the adaptive beam forming process performed in DSP 62. At 100, the process begins with a set of initial weights. As noted above, this set may have $w_i=1$ and all the other $w_i$ equal to zero. At 102, a set of data sample vectors, $x_j$ is processed using this initial set of weights. This processing involves forming the sum of the weighted samples and converting this sum to a constant modulus version of the sum. Then, using equation (8) at 104, a new set of weights is derived from the samples of this common modulus version of the sum and from a matrix, A, each of whose rows is one of the vectors, $x_j$.

Next, at 106, additional data samples are processed using the new set of weights, and the SAT frequency present in this processed data is determined. At 108, a test is made to determine whether this is the SAT assigned to the base station or not. In the event that it is not the correct SAT, then it is known that the adaptive beam forming apparatus has formed a beam on an incorrect RF signal. In this event, at 110 a new set of initial weights is formed, this set being constrained to be orthogonal to the set of weights that was used to focus on the incorrect RF signal. This new set of initial weights is chosen to be the sum of one or more rows of the matrix, P, as defined by equation (3). As a result of this constraint, the beam pattern formed by the new set of weights is forced to have a null in the direction of the incorrect RF signal. The process then returns to step 102 where new input data samples are processed using the new set of initial weights.

This iterative process continues until, at some point, the extraneous RF signals have been nulled in the beam pattern and the pattern focuses on the correct RF signal, that is, the one having the correct SAT. At this point a positive result is obtained at test 108, and the process loops back to step 102. Then the process continues to iterate through the loop represented in FIG. 7 so as to continue to modify the set of weights as necessary such that the beam continues to track the target RF signal source as it moves about the service region. Note that, when in this mode of tracking the desired signal, there is no need to null out the signal on which the beam has focused since it is focused on the correct signal. Consequently, there is no need to select a new set of initial weights at each pass through the loop, since the selection of new weights is only done when one wishes to null out the largest remaining signal.

The LSE SAT estimation technique implemented by the system will next be described. When the beam of the adaptive antenna is focused in the largest signal present in the received RF energy, the SAT associated with that signal will normally be significantly larger than the SAT associated with any other signal which has been suppressed by the focused beam pattern (typically by 20 dB or more). When the LSE process estimates the amplitudes of any SATs present, one will be found to be materially larger in amplitude than any of the other two. This then will be the SAT associated with the signal tracked by the focused beam.

After the adaptive beam forming process has focused on a particular signal, the detected output of the adaptive antenna is a stream of complex samples (I and Q) designated as the $y_i$ in the discussion above of the adaptive beam forming process, and separated in time by the sampling rate of an A to D converters which digitize the input signals. The adaptive antenna outputs, $y_j$, are then frequency demodulated to obtain the audio data, which is composed of voice data and the three sinusoid SAT signals. The complex audio data is then high pass filtered to remove the speech data (below 3,000 Hz) from the remaining SAT composite data (above 3,000 Hz). A model of the received sampled composite SAT data is given by:

$$z=Ax+v \qquad (9)$$

where z is the vector of complex composite SAT data samples received from the demodulator and high pass filter output. A is a matrix of complex sinusoids representing the three SATs available in the system, x is a vector of complex amplitudes (to be estimated), and v is a vector of complex measurement errors (noise). Following is an expanded version of this vector-matrix equation.

$$\begin{bmatrix} z_1 \\ z_2 \\ \vdots \\ z_N \end{bmatrix} = \begin{bmatrix} e^{j\omega_1 t_1} & e^{j\omega_2 t_1} & e^{j\omega_3 t_1} \\ e^{j\omega_1 t_2} & e^{j\omega_2 t_2} & e^{j\omega_3 t_2} \\ \vdots & \vdots & \vdots \\ e^{j\omega_1 t_N} & e^{j\omega_2 t_N} & e^{j\omega_3 t_N} \end{bmatrix} \cdot \begin{bmatrix} x_1 \\ x_2 \\ x_3 \end{bmatrix} + \begin{bmatrix} v_1 \\ v_2 \\ \vdots \\ v_N \end{bmatrix} \qquad (10)$$

where $\omega 1$, $\omega 2$, $\omega 3$ and $X_1$, $X_2$, and $X_3$, are the radian frequencies and complex amplitudes of the respective SATS, the $t_i$ are the sampling times of the $i^{th}$ samples, the $z_i$ are the observations (samples), the $v_i$ are the complex measurement errors, and N is the number of samples taken. Note that this matrix, A, and the vector, x are different from, and not related to, the matrix, A, and the vector, x, which were described above in connection with the beam forming process.

This is a classic problem of an overdetermined system of linear equations. The problem is said to be overdetermined because there are many more equations than unknowns. For example, one may take 100 samples, resulting in 100 equations, to solve for the three unknown complex amplitudes. This type of problem commonly arises from trying to fit a model to measured data.

If there were no noise or computational roundoff errors in the system, the estimation problem could be solved as a system of three equations in three unknowns:

$$Z_o = A_o x \qquad (11)$$

where $_o$ and $z_o$ are A and z formed from three samples (e.g., N=3). This equation could then be solved for the unknown amplitudes contained in x by inverting the matrix $A_o$ to obtain $$x = A_o^{-1} Z_o \qquad (12)$$

Due to the presence of noise and roundoff errors, a solution based on three samples may not be possible because the matrix $A_o$ may become singular. Even if it is possible, such a solution may not have acceptable accuracy. The better approach is to take many samples and solve the resulting equation for the best LSE answer.

The LSE solution results in an estimate $\hat{x}$ of the parameter vector x such that the (squared) length of the estimation error vector $E_x$ is minimized, where $\epsilon_2$ is given by $$\epsilon_z = z - A\hat{x} \qquad (13)$$

This is satisfied when the estimation error vector $\epsilon_z$ is orthogonal to the column space of the matrix A. This condition is expressed as $${}^H \epsilon_z = 0 \qquad (14)$$

which results in $$A^H z - A^H A \hat{x} = 0 \qquad (15)$$

This is solved by inverting the matrix $A^H A$, resulting in the estimated value of x given by $$\hat{x} = (A^H A)^{-1} A^H z \tag{16}$$

This is the desired equation for the least-mean-square-error estimate of x from the data z and is sometimes called the "normal" equation. It is the projection of the measurement vector z into the column space of the matrix A.

Figure 8:
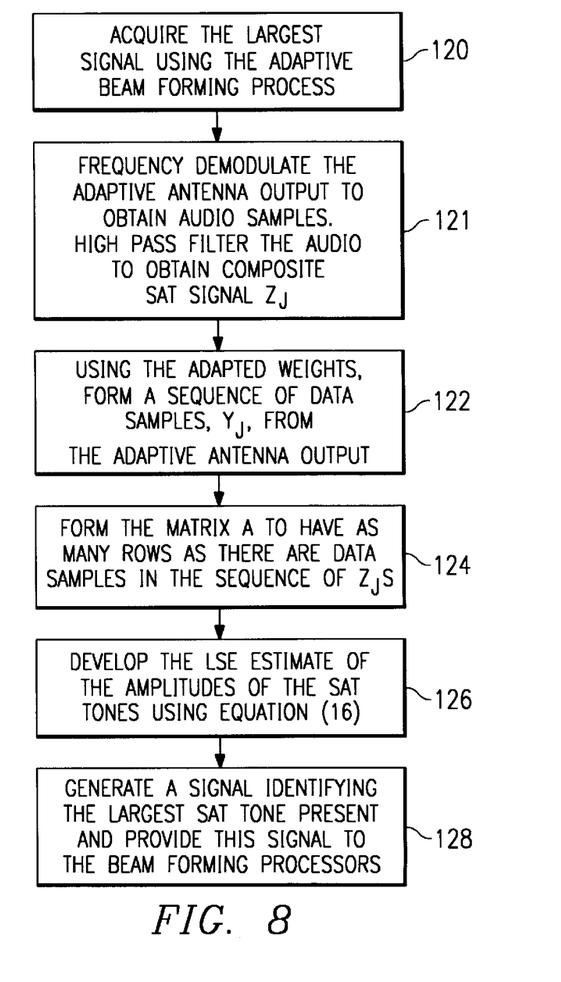
FIG. 8 is a flow chart illustrating the steps involved in obtaining the estimates of the relative sizes of the SAT tones present in the received data.

FIG. 8 is a flow chart illustrating the steps involved in obtaining the estimates of the relative sizes of the SAT tones present in the received data. At step 120, the adaptive beam forming process as described above is implemented to focus the beam on the largest received signal. Then, at step 122, using the adapted set of weights, $w_j$, the process acquires a sequence of data samples, $y_j$, from the output of the adaptive antenna. At step 121, the adaptive antenna output is frequency demodulated to obtain audio samples. These are high pass filtered to obtain the composite SAT signal comprised of the $z_j$'s. The matrix, A, is then formed at step 124 to have the same number of rows as there are data samples $z_j$ in the column vector, z. Equation (16) is then used at step 126 to develop the LSE estimates of the relative amplitudes of any SAT tones present in the input data. Finally, at step 128, a signal is generated to identify the largest SAT tone present and this signal is provided to the beam forming processor.

The estimation accuracy of this process can also be estimated, giving insight into how many samples must be collected for a given degree of accuracy.

From Equation (9), the measurement vector z is composed of Ax (the true value, or the value of measurement one would obtain without errors) plus v, a vector or errors. Thus, by substituting Equation (9) into Equation. (16) the estimator is also expressed as $$\hat{x} = (A^H A)^{-1} A^H z = (A^H A)^{-1} A^H (Ax + v) = x + (A^H A)^{-1} A^H v \tag{17}$$

This equation states that the estimate $\hat{x}$ is composed of the true value (x) plus $(A^H A)^{-1} A^H v$, an estimation error term. This latter term is the projection of the measurement noise into the column space of A. Designating this term as u, the estimator $\hat{x}$ is thus given by $$\hat{x} = x + u \tag{18}$$

with the estimation error given by $$u = (A^H A)^{-1} A^H v \tag{19}$$

and the error covariance matrix $R_{ww}$ given by $$R_{uu} = E\{(A^H A)^{-1} A^H v [(A^H A)^{-1} A^H v]^H\} = (A^H A)^{-1} A^H R_{vv} A (A^H A)^{-1H} \tag{20}$$

where E denotes the expected value operation and $R_{vv}$ denotes the covariance matrix of the measurement noise vector v.

Assuming that the noise in the vector v is composed of uncorrelated identically distributed complex gaussian samples, then the covariance matrix $R_{vv}$ of the noise in the estimator is given by $\sigma^2 I$, where I is the identity matrix. The covariance matrix of the estimation error then reduces to $$R_{uu} = \sigma^2 (A^H A)^{-1H} \tag{21}$$

The diagonal elements of $R_{uu}$ are the variances of the estimates of the complex amplitudes for the respective estimates (e.g., the second element on the diagonal is the variance of the $2^{nd}$ component of $\hat{x}$) and the square roots of the diagonal elements are the corresponding (complex) standard deviation values.

Figure 9:
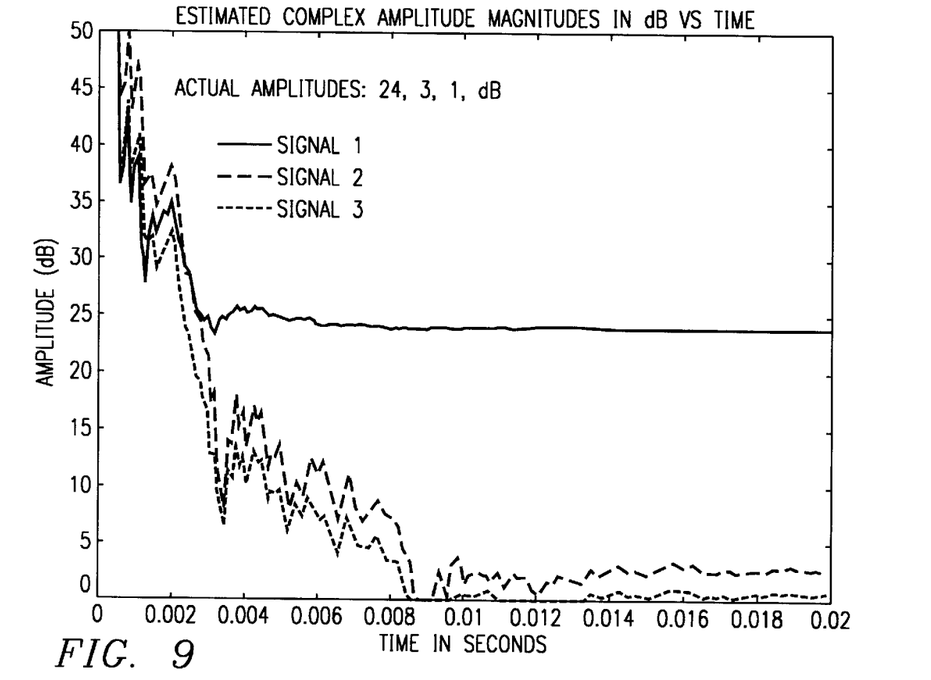
FIG. 9 shows representative values of SAT estimates resulting from a computer simulation of the LSE process.

A computer based analysis was performed to explore the behavior of this estimation procedure. The analysis generates, via computer simulation, a sequence of measurements z formulated via equation (9). It then performs two tasks. First it successively generates an estimate $\hat{x}$ of the complex amplitudes by using Equation (16). FIG. 9 shows the absolute values of the estimates as a function of the number of samples used to formulate the estimates (expressed as time, 0.0001 second per sample). As expected, the longer the time series used to form an estimate, the more accurate the estimate becomes. When the number of samples reaches 50 (a sampling time of 0.005 seconds) the differing levels of signals are substantially resolved.

Figure 10:
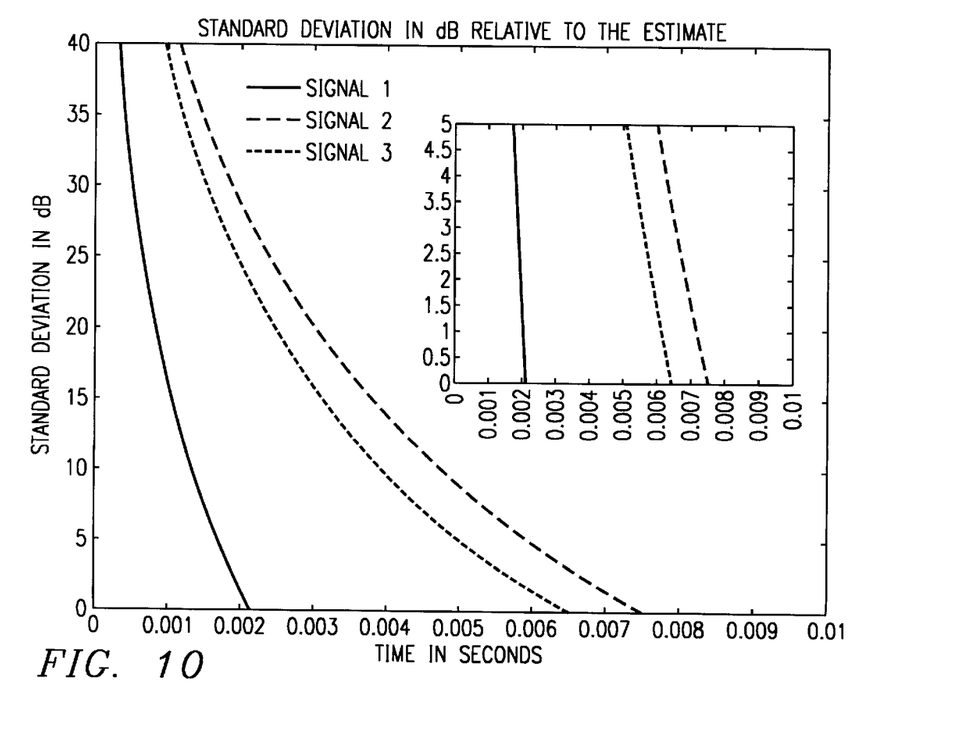
FIG. 10 illustrates the variability of the estimates resulting from the computer simulation as a function of the number of samples used.

Secondly, the computer based analysis plots the estimate standard deviations obtained from diagonal elements of the matrix $R_{ww}$ as given in Equation (14). FIG. 10 shows the standard deviations, also as a function of the number of samples used to form the estimate. These values are in dB relative to the estimates. Table 1, below, shows the parameters used for this analysis.

TABLE 1

| Parameters of the Computer Analysis | | | |
|---|---|---|---|
| | Frequency (Hz) | Power (dBnoise) | Phase (Degrees) |
| Signal 1 | 5970 | 24 | 137 |
| Signal 2 | 6000 | 3 | 37 |
| Signal 3 | 6030 | 1 | 150 |
| Measurement Noise | | $\sigma^2 = 1$ (0 dB) | — |
| Sample Frequency | 10000 | — | — |

What is claimed is:

1. A communication system for receiving, from among a plurality of signals each of which includes one of a plurality of identifier components, a signal having a preselected one of said plurality of identifier components, said system comprising:

a. an antenna having a configurable beam pattern;
   b. a focusing subsystem for causing said configurable beam pattern to be focused on the largest of said plurality of signals;
   c. an identifier subsystem for determining which of said plurality of identifier components is included in said largest signal; and
   d. a nulling subsystem which, in the event that the identifier component identified by said identifier subsystem is not said preselected one of a plurality of identifier components, causes modification of said configurable beam pattern to the effect that a null is formed in the direction of said largest signal, and said beam pattern is refocused on the next largest signal.

2. The communication system of claim 1 wherein said process of modifying said configurable beam pattern to form a null in the direction of one signal and to refocus said beam pattern on the next largest signal is repeated iteratively until the beam pattern is focused on the signal having said preselected one of a plurality of identifier components.

3. The communication system of claim 1 further comprising a tracking subsystem which, when the largest signal present in the output signal from the antenna is determined to include said preselected one of said plurality of identifier components, causes said beam pattern to be modified appropriately so as to continue to be focused on that signal.

4. A communication system for receiving, from among a plurality of signals each of which includes one of a plurality of identifier components, a signal having a preselected one of said plurality of identifier components, said system comprising:

a. an antenna having a configurable beam pattern;

b. a focusing subsystem for causing said configurable beam pattern to c. be focused on the largest of said plurality of signals; an identifier subsystem for determining which of said plurality of identifier components is included in said largest signal, said identifier subsystem utilizing an LSE process for determining which of said plurality of identifier components is included in said largest signal.

5. A system for wireless communication with a designated one of a set of at least one remote station(s) wherein the signal from each such remote station includes an information bearing component and one of a plurality of identifier components, and wherein a preselected one of said plurality of identifier components is included with the signal from said designated remote station, said system comprising:

a. base station for receiving and utilizing the information content of the signal from said designated remote station;

b. an antenna having a configurable beam pattern;

c. a focusing subsystem for causing said configurable beam pattern to be focused on the largest of the signals from said set of at least one remote station(s);

d. an identifier subsystem for determining which of said plurality of identifier components is included in said largest signal; and e. a nulling subsystem which, in the event that the identifier component identified by said identifier subsystem is not said preselected one of said plurality of identifier components, causes modification of said configurable beam pattern to the effect that a null is formed in the direction of said largest signal, and said beam pattern is refocused on the next largest signal.

6. The communication system of claim 5 wherein said process of modifying said configurable beam pattern to form a null in the direction of one signal and to refocus said beam pattern on the next largest signal is repeated iteratively until the beam pattern is focused on the signal having said preselected one of said plurality of identifier components.

7. The communication system of claim 5 further comprising a tracking subsystem which, when the largest signal present in the output signal from the antenna is determined to include said preselected one of said plurality of identifier components, causes said beam pattern to be modified appropriately so as to continue to be focused on that signal.

8. A system for wireless communication with a designated one of a set of at least one remote station(s) wherein the signal from each such remote station includes an information bearing component and one of a plurality of identifier components, and wherein a preselected one of said plurality of identifier components is included with the signal from said designated remote station, said system comprising:

a. base station for receiving and utilizing the information content of the signal from said designated remote station;

b. an antenna having a configurable beam pattern;

c. a focusing subsystem for causing said configurable beam pattern to be focused on the largest of the signals from said set of at least one remote station(s);

d. an identifier subsystem for determining which of said plurality of identifier components is included in said largest signal, said identifier subsystem utilizing an LSE process for determining which of said plurality of identifier components is included in said largest signal.

9. A communication system for receiving, from among a plurality of signals each of which includes one of a plurality of identifier components, a signal having a preselected one of said plurality of identifier components, said system comprising:

a. an antenna comprised of a plurality of elements, said antenna having a configurable beam pattern;

b. a focusing subsystem for applying a selectable weight to the output of each of said elements and operative to apply initial individually selectable weights to the outputs of said plurality of elements, and is further operative to modify said initial weights to cause said configurable beam pattern to be focused on the largest of said plurality of signals;

c. an identifier subsystem for determining which of said plurality of identifier components is included in said largest signal; and d. a nulling subsystem which, in the event that the identifier component identified by said identifier subsystem is not said preselected one of a plurality of identifier components, causes said focusing subsystem to select a new set of weights, said new set of weights being orthogonal to said modified set of weights and to modify said new set of weights to focus said configurable beam pattern on the next largest signal and too form a null in the direction of said largest signal.

10. The communication system of claim 9 wherein, until said identifier subsystem identifies a signal having said preselected one of a plurality of identifier components, said focusing subsystem iteratively repeats the process of adjusting said configurable beam pattern to form nulls in the directions of a series of signals which are decreasing in magnitude and focusing said pattern on the next smaller of said plurality of signals.

11. A communication system for receiving, from among a plurality of signals each of which includes one of a plurality of identifier components, a signal having a preselected one of said plurality of identifier components, said system comprising:

a. an antenna comprised of a plurality of elements, said antenna having a configurable beam pattern;

b. a focusing subsystem for applying a selectable weight to the output of each of said elements, said focusing subsystem being further operative to focus said configurable beam pattern to be focused on the largest of said plurality of signals; and c. an identifier subsystem for determining which of said plurality of identifier components is included in said largest signal said identified subsystem utilizing an LSE process for determining which of said plurality of identifier components is included in said largest signal.

12. A method of receiving, from among a plurality of signals each of which includes one of a plurality of identifier components, a signal having a preselected one of said plurality of identifier components, said method comprising the steps of:

a. focusing the beam pattern of an antenna having a configurable beam pattern on the largest of said plurality of signals;

b. determining which of said plurality of identifier components is include din said largest signal;

c. in the event that it is determined that said preselected one of said plurality of identifier components is not included in said largest signal, refocusing said configurable beam pattern to form a null in the direction of said largest signal and to refocus on the next largest signal;

d. determining which of said plurality of identifier components is included in said next largest signal;

e. repeating steps a. and b. until said configurable beam pattern is focused on a signal having said preselected one of said plurality of identifier components; and f. thereafter causing said configurable beam pattern to be modified to the extent necessary to follow the signal having said preselected one of said plurality of identifier components.

13. A method of receiving, from among a plurality of signals each of which includes one of a plurality of identifier components, a signal having a preselected one of said plurality of identifier components, said method comprising the steps of:

a. focusing the beam pattern of an antenna having a configurable beam pattern on the largest of said plurality of signals;

b. determining which of said plurality of identifier components is include din said largest signal; and c. using an LSE process for identifying which of said plurality of identifier components is included as part of a given signal.

14. The communication system of claim 1 wherein said identifier subsystem utilizes an LSE process for determining which of said plurality of identifier components is included in said largest signal.

15. The communication system of claim 5 wherein said identifier subsystem utilizes an LSE process for determining which of said plurality of identifier components is included in said largest signal.

* * * * *